United States Patent [19]

Biondetti et al.

[11] 4,213,232
[45] Jul. 22, 1980

[54] CONTROLLED DEFLECTION ROLL

[75] Inventors: Mario Biondetti; Ignazio Marchioro, both of Shio, Italy

[73] Assignee: Escher Wyss Limited, Zürich, Switzerland

[21] Appl. No.: 41,762

[22] Filed: May 23, 1979

[30] Foreign Application Priority Data

Jun. 2, 1978 [CH] Switzerland .................. 6068/78

[51] Int. Cl.² ........................................... B21B 13/02
[52] U.S. Cl. ............................................. 29/116 AD
[58] Field of Search ................... 29/113 AD, 116 AD

[56] References Cited

U.S. PATENT DOCUMENTS

| 3,802,044 | 6/1972 | Spillman et al. | 29/116 AD X |
|---|---|---|---|
| 3,885,283 | 5/1975 | Lehmann et al. | 29/113 AD |
| 4,058,877 | 11/1977 | Lehmann et al. | 29/116 AD |
| 4,069,569 | 1/1978 | Meckel et al. | 29/116 AD |
| 4,074,624 | 2/1978 | Biörnstad | 29/116 AD X |
| 4,092,916 | 6/1978 | Link et al. | 29/116 AD X |

Primary Examiner—Wayne L. Shedd
Attorney, Agent, or Firm—Werner W. Kleeman

[57] ABSTRACT

A controlled deflection roll comprising a stationary roll support and a roll shell rotatable about such roll support. The roll shell is guided, with the aid of guide elements, relative to the roll support in the pressure plane of the controlled deflection roll in order to generate lift-off movements. Lift-off pistons are guided in the roll support and bear against inner surfaces of the guide elements. Each of the lift-off pistons can be arranged within guide means of the related guide element, such guide means being bounded by essentially parallel guide surfaces.

2 Claims, 2 Drawing Figures

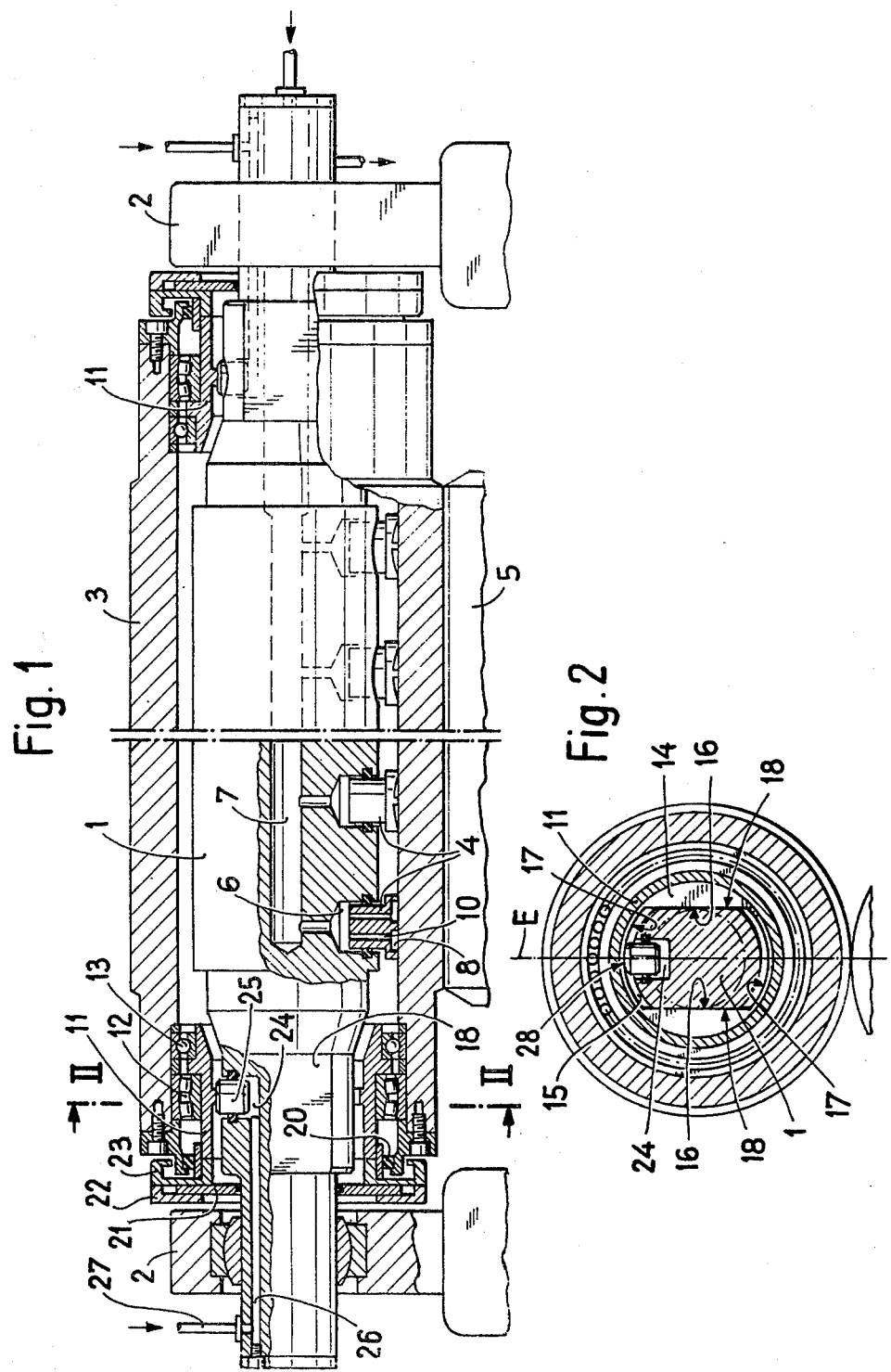

CONTROLLED DEFLECTION ROLL

BACKGROUND OF THE INVENTION

The present invention relates to a new and improved construction of a controlled deflection roll—sometimes referred to in the art as a roll with bending or sag compensation—which is of the type comprising a stationary roll support or core, a roll shell rotatable about the stationary roll support and pressure or support elements located between the roll support and the roll shell. The ends of the roll shell are rotatably mounted upon guide elements, each guide element having a guide opening possessing two substantially parallel guide surfaces which are guided along corresponding guide surfaces of the roll support.

Such type controlled deflection roll is known to the art, for instance, from the commonly assigned U.S. Pat. No. 3,802,044, granted Apr. 9, 1974 and U.S. Pat. No. 3,885,283, granted May 27, 1975. With these state-of-the-art controlled deflection rolls the pressure or support elements, which may have the shape of hydraulic pistons, serve to press the roll shell against a counter roll.

Now for the lift-off of the roll shell from the counter roll, heretofore there were employed counter pistons, such as, for instance, disclosed and illustrated in the commonly assigned, U.S. Pat. No. 4,058,877, granted Nov. 22, 1977. These counter or lift-off pistons, which are constructed in the same manner as the pistons serving as pressure or support elements, during their operation bear against the inner surface of the roll shell. Since this inner surface, during the lift-off operation, in most cases rotates in relation to the roll support, provision must be made for lubricating the running or contact surfaces of the counter pistons. During hydrostatic lubrication of the running surfaces of pistons, according to the aforementioned U.S. Pat. No. 3,802,044, such requires a continuous throughput or feed of hydraulic oil.

SUMMARY OF THE INVENTION

Therefore, with the foregoing in mind, it is a primary object of the present invention to provide a new and improved construction of a controlled deflection roll which is not afflicted with the aforementioned drawbacks and shortcomings of the prior art.

Another and more specific object of the present invention aims at the provision of apparatus, by means of which it is possible to accomplish the aforementioned liftoff movement, with appreciably simpler means than heretofore employed, and predominantly while avoiding the necessity for lubricating the running surfaces of the counter or lift-off pistons.

Yet a further significant object of the present invention aims at a new and improved construction of controlled deflection roll employing novel lift-off means for raising the controlled deflection roll from a counter roll in a most efficient and reliable manner, utilizing a construction which does not absolutely require a lubrication system for the lift-off means.

Now in order to implement these and still further objects of the invention, which will become more readily apparent as the description proceeds, the controlled deflection roll of the present development is manifested by the features that there is arranged in the roll support, at the region of each guide element, a lift-off piston which can be activated by a suitable pressurized fluid medium. The direction of pressure exertion of such pistons extends in the pressure plane of the controlled deflection roll in a direction opposite to the direction in which the pressure is exerted by the pressure or support elements. Each lift-off piston is capable of being brought into contact or pressed against an inner surface of the related guide element.

Such type arranged lift-off pistons, upon actuation thereof, bear against a surface which, in relation to the roll support, only performs a translatory movement and does not rotate relative thereto. The expenditure heretofore needed for lubrication of running surfaces, with this design, thus can be dispensed with. Additionally, the pistons serving for the lift-off function, can be designed to be considerably simpler than the pistons serving as the pressure elements.

Preferably, each of the lift-off pistons, with its axis, can be arranged within the guide opening of the related guide element and can bear against an end surface of such opening. In this way there is obtained a particularly advantageous flow of the forces in the guide element, since normally the anti-friction bearing means, typically roller bearing, serving for transmitting the primary forces between the guide element and the roll shell is arranged in the plane of such guide opening.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a schematic sectional view of a controlled deflection roll constructed according to the invention; and FIG. 2 is a sectional view of the controlled deflection roll shown in FIG. 1, taken substantially along the line II—II thereof.

DETAILED DESCRIPTION OF THE PREFERRED EMBODIMENTS

Describing now the drawings, it is to be understood that only enough of the construction of the controlled deflection roll and its related components, such as the counter roll, typically as used in the environment of a rolling mill, have been shown in the drawings in order to enable those skilled in the art to readily understand the underlying principles and concepts of the present invention. Turning attention now to FIGS. 1 and 2, the exemplary embodiment of controlled deflection roll illustrated therein, essentially is of the type known from the previously mentioned U.S. Pat. Nos. 3,802,044 and 3,885,283, to which reference may be readily had and the disclosure of which is incorporated herein by reference. Such controlled deflection rolls specifically will be seen to comprise a stationary roll support or core 1 which is pivotably arranged in side elements 2 of a not further shown but conventional frame arrangment, but secured against rotation by standard and therefore not particularly illustrated means, as is well known in this technology. Rotatable about the roll support 1 is a rotatable roll shell 3 which, during operation, is pressed by hydrostatic pressure or support elements 4 against a counter roll 5. The pressure elements 4, described in detail in the previously mentioned U.S. Pat. No. 3,802,044, are sealingly guided in bores or chambers 6 of the roll support 1 and are subjected to the action of the pressure of a hydraulic pressurized fluid medium, such as oil, infed through a longitudinal bore 7 provided in the roll support 1. These pressure or support elements 7, here shown in the form of pressure pistons, are provided with hydrostatic bearing pockets 8 which flow communicate by means of throttle bores 10 with the related bore 6 in which each such pressure element 7 is displaceably guided and form a hydrostatic bearing or support of the pressure elements or pressure pistons 4 at the not particularly referenced inner surface of the roll shell 3.

As still further evident by referring to FIG. 1, at the opposed ends of the roll shell 3 there is located at respective guide element or guide means 11 upon which the roll shell 3 is rotatably mounted by means of suitable bearings 12 and 13. Since the construction of the guide elements 11 at each of the opposed ends of the roll shell 3 and the components coacting therewith are the same, it will suffice to merely consider the construction of the controlled deflection roll appearing at the left-hand side of the arrangement of FIG. 1. Now each guide element 11 is provided with an inner wall 14 at which there is formed an elongate guide opening 15, by means of which the related end of the roll support 1 is guided. Such guide opening 15 is bounded by two essentially parallel guide surfaces 16 and two arcuate or arc-shaped end surfaces 17. The lateral guide surfaces 16 are guided along essentially flat or planar guide surfaces 18 of the roll support 1. Such construction of controlled deflection roll likewise has been described in detail in the aforementioned U.S. Pat. No. 3,885,283.

Continuing the internal space or compartment of the controlled deflection roll is closed or sealed towards the outside, in known manner, by a related seal arrangement or seal means 20, disposed between the related stationary guide element or guide means 11 and the roll shell 3, and equally by means of a related displaceable sealing plate 21. This sealing plate 21 is sealingly guided between two parts or elements 22 and 23 which are attached at the guide element 11.

Now according to important aspects of the invention bores 24 are provided at the opposed ends of the roll support 1, the lengthwise axes of such bores 24 being disposed at the region of the walls 14 of the guide elements 11. Now in these bores 24 there are sealingly guided the lift-off pistons 25 or equivalent structure. Actuation of the lift-off pistons 25 is accomplished by connecting the bores 24, by means of connection bores or channels 26, at pressurized fluid medium lines or conduits 27. As particularly well seen by referring to FIG. 2, an end surface 28 of the lift-off piston 25 coacts with the neighboring, confronting end surface 17 of the guide opening 15.

When the pressure elements 10 are load relieved and the bores 24, in which there are arranged the lift-off pistons 25, are placed under pressure, then, as should be readily evident, the roll shell 3 is lifted-off the counter roll 5. Also when the roll shell 3 rotates the end surface 28 of each lift-off piston 25 bears against a stationary, non-rotating surface, namely the related end surface 17. Lubrication of the mutually coacting surfaces 17, 28 is not necessary, so that beneficially there is avoided all of the equipment and construction which otherwise would be needed to provide such lubrication. Furthermore, the lift-off pistons 25 can be designed to be considerably simpler in their construction than the pressure pistons 4 of the controlled deflection roll. As illustrated, they can have the shape of solid cylindrical bodies.

The lift-off pistons 25 need not bear against the related end surface 17 of the guide opening 15. There is also conceivable, while practicing the teachings of the invention, to provide a construction wherein such pistons bear against another inner region of the related guide element 11, for instance the cylindrical inner surface laterally of the inner wall 14.

While there are shown and described present preferred embodiments of the invention, it is to be distinctly understood that the invention is not limited thereto, but may be otherwise variously embodied and practiced within the scope of the following claims. ACCORDINGLY,

What we claim is:

1. A controlled deflection roll comprising:
   a stationary roll support;
   a roll shell;
   means for mounting said roll shell to be rotatable about said stationary roll support;
   pressure elements arranged between said roll support and said roll shell;
   said roll shell having opposed end regions;
   guide elements for rotatably mounting said opposed end regions of said roll shell;
   said roll support having guide surface means;
   each guide element having a guide opening bounded by two substantially parallel guide surfaces guided at said guide surface means of said roll support;
   each of said guide elements having an inner surface;
   each opposed end region of the roll shell having an outer surface spaced from said inner surface of the related guide element to define therebetween a gap;
   a respective piston arranged in the roll support at the region of each guide element and actuatable by a pressurized fluid medium for axial movement in said gap in the direction of said inner surface of the related guide element;
   said piston having a pressure-exerting direction essentially in a pressure plane of the controlled deflection roll and effective in a direction opposite to the direction of pressure exertion by the pressure elements; and
   each said piston, when actuated, serving to contact said inner surface of the related guide element.

2. The controlled deflection roll as defined in claim 1, wherein:
   each said piston has a lengthwise extending axis and is arranged within the guide opening of the related guide element and bears against the inner surface of such guide element; and
   said inner surface defining an end surface of such guide opening.

* * * * *